Sept. 22, 1931. C. A. NORGREN 1,824,363
SPRAY GUN
Filed April 16, 1928
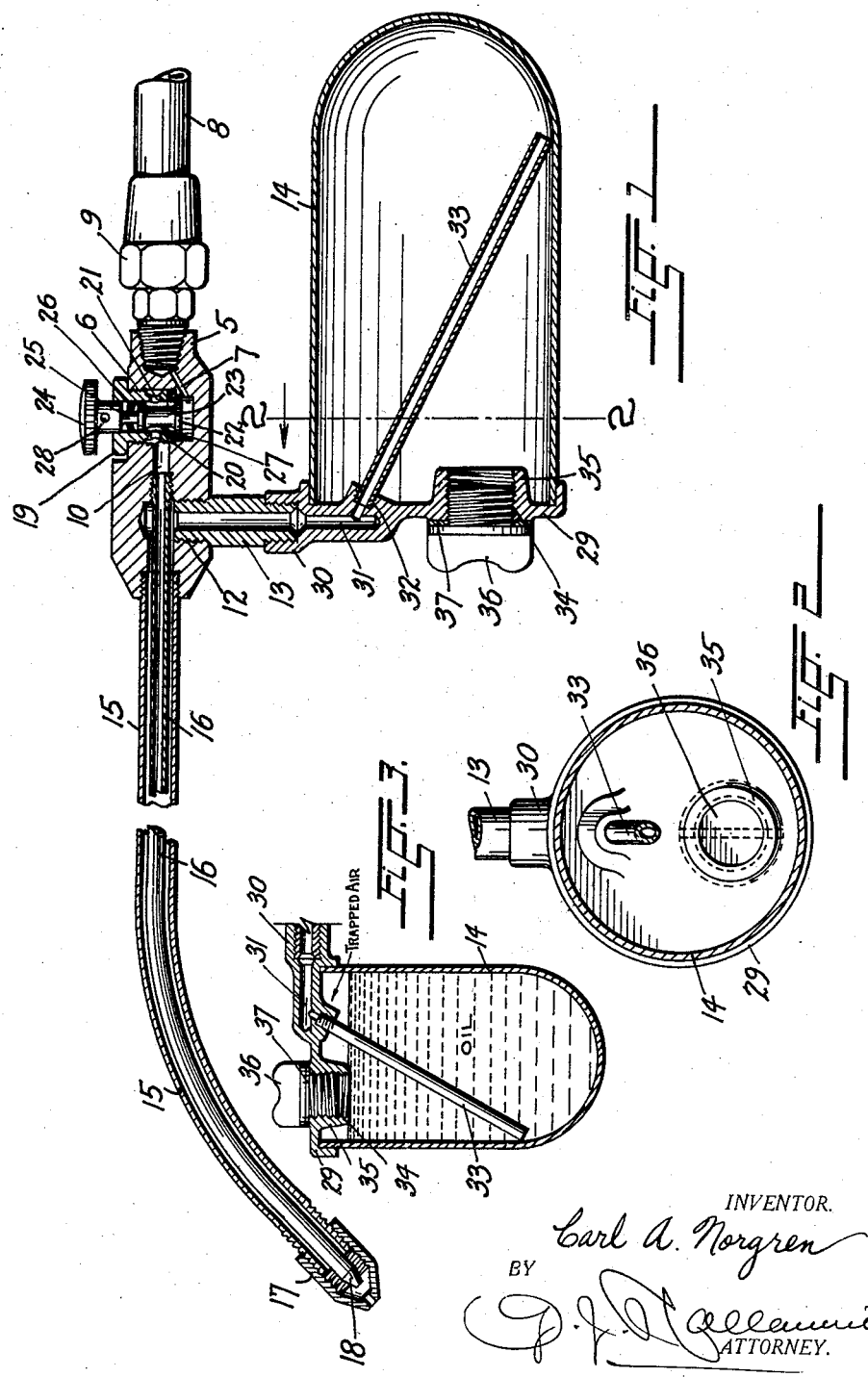
INVENTOR.
Carl A. Norgren
BY
ATTORNEY.

Patented Sept. 22, 1931

1,824,363

UNITED STATES PATENT OFFICE

CARL A. NORGREN, OF DENVER, COLORADO

SPRAY GUN

Application filed April 16, 1928. Serial No. 270,400.

This invention relates to lubricating guns of the type in which a lubricant contained in a siphon cup, is discharged through a nozzle in the form of a spray, through the medium of a pressure fluid.

The invention pertains more particularly to improvements of guns of the construction shown and described in my U. S. Patent No. 1,736,357, issued on the 19th day of November, 1929, and its primary object resides in the provision of means in association with the siphon-cup of the instrument to constantly maintain sufficient air-pressure in the cup for the proper operation of the gun without the use of air-vents such as have been heretofore devised to admit air to the lubricant-reservoir at each operation.

The elimination of air-vents obviously prevents leakage during the operation as well as when the gun is not in use. It furthermore prevents possible incapacitation of the gun as may occur when for any reason the air-vent fails to function, as when the grease cakes in same.

An embodiment of the invention has been illustrated in the accompanying drawings, in which like reference characters designate like parts in the two figures.

Figure 1 of the drawings is a sectional elevation of the improved spray gun.

Figure 2 is a section taken on the line 2—2, Figure 1.

Figure 3 is a sectional elevation of the lubricant holder after filling same.

Referring further to the drawings, the gun comprises a body 5 suitably bored to provide a valve-chamber 6 connected at its inner portion by a duct 7 with a screw-threaded socket at an end of the body in which a conduit 8 connected with a conveniently located source of air supply, is fastened by means of a coupling 9. An axial bore 10 at the opposite end of the body likewise connects with the valve chamber, and a passage 12 transverse to the bore is screw-threaded for the application of a short tube 13 that connects with the siphon cup 14.

The bore 10 has three sections of progressively increased diameters, the smallest of which connects with the valve chamber and the largest of which is at the end of the body and screw-threaded for the attachment of a bent pipe 15. A second pipe 16 of smaller diameter is screwed into the smaller end of the bore and it extends inside the larger pipe to provide an annular space through which the oil passes to the jet or nozzle through which it is discharged onto the machine parts to be lubricated.

The nozzle consists of an apertured cap 17 screwed onto the end of the outer pipe around a jet tip 18 screwed into the end of the inner pipe. The cap is normally spaced from the tip to provide a passage for the discharge of the oil but it can be screwed into engagement with the tip to seal the device when not in use.

Mounted in the valve chamber 6 is a valve device which controls the passage of air from the conduit 8 to the air pipe 16. The device consists of a cage 19 screwed into the chamber in engagement with a washer or gasket 20 of soft material placed against a shoulder at the inner end of the chamber to provide a resilient valve seat.

The cage has one or more ports 21 in an exterior groove for the connection of its interior with the bore 10 of the body into which the air pipe 16 extends.

The valve proper consists of a flat disk 22 at the end of a stem 23 that is slidably fitted in the cage 19 and which at its protruding extremity has a screw-threaded connection with a head or button 24.

The valve stem is peripherally grooved as at 25, to provide a space for a flexible sealing washer 26 which contacts with the wall of the cage to prevent leakage of air past the valve stem when the button is depressed to separate the valve from its seat. The stem is also peripherally grooved at 27 to provide a passage for the air entering through the duct 7 past the open valve, to the ports 21.

A hole 28 in the stem immediately below the button provides for the admission of an awl or other pointed tool to hold the stem while the button 24 is screwed upon the extremity thereof. The sealing washer 26 is slightly larger than the opening of the cage so that when the valve stem is pressed into the valve cage, the washer will assume the cup-shaped form shown in the drawings.

When the valve is in the closed position in which it engages the resilient gasket at the under side thereof, the diaphragm cups upward as shown in the drawings and if the button is depressed, the consequent inward movement of the valve stem causes the diaphragm to press tightly against the wall of the valve cage thereby sealing the latter against the escape of air around the valve stem. When the button is subsequently released, the diaphragm springing back to its normal shape, aids in returning the valve to its original position.

The siphon cup 14 is of cylindrical form and extends axially in substantially parallel relation to the body of the gun. It has a flanged head 29 provided with a threaded socket 30 for its attachment to the short tube 13 and it has in communication with the nozzle, a short duct 31 provided with a transverse opening 32 for the connection of a siphon tube 33.

This tube extends to the end of the cup rearward of the gun with relation to the position of its discharge nozzle and it is this feature in the construction which permits of the gun being operated at different angles from the horizontal to the vertical.

The head of the siphon-cup has an internally screw-threaded filler opening 34, provided by a neck 35 of cylindrical form that extends into the cup in spaced relation to the inner circumferential surface thereof. The neck is the element that provides for maintaining an air pressure in the duct without the use of vents or valves, since it causes air to be entrapped in the annular space around it, as shown in Figure 3, when the cup is filled with the lubricant.

The filler opening 34 is normally closed by a plug 36 screwed upon a resilient washer 37 at the rim of the neck.

In the operation of the gun, the cup is filled with oil and the body is connected with the hose 8 of a source of air supply. The air passing through the duct 7 into the inner end of the valve chamber presses the valve 22 against the resilient seat provided by the gasket and thereby obstructs the flow of air to the interior of the valve cage.

To apply the oil to a machine part, the button is depressed which separates the valve from its seat and establishes a line of communication between the source of air and the pipe 16 by means of the conduit 8, the duct 7, the valve chamber 6, the port or ports 21 of the cage 19 and the bore 10 of the housing. The air forcibly driven through the jet 18 at the end of the pipe, produces a partial vacuum which draws the oil from the siphon cup through the pipe connection 13 and the annular space between the pipes 15 and 16 and causes it to issue through the aperture of the cap 17 on the outer pipe in the form of a spray.

The relative sizes of the apertures in the cap and the jet are such as to produce a maximum atomizing effect. The discharge is readily regulated by adjustment of the screw cap relative to the air jet and when the gun is not in use the outlet may be sealed by screwing the cap tight against the tip.

The pipes are bent at an angle of approximately 45 degrees to render its nozzle accessible to different parts of an automobile from a point beneath the same. The cup-shaped washer of the valve effectively seals the valve chamber against the escape of air without restricting or otherwise interfering with the movement of the valve, and the position of the siphon cup and the siphon pipe relative to the body of the gun permits of using the gun at different angles as hereinbefore explained.

At the time the cup 14 was filled, sufficient air was entrapped in the space around the inwardly projecting filler-neck, as shown in Figure 3, to enable the vacuum created at the nozzle to draw the liquid from the receptacle to and through the opening of the nozzle. Under ordinary working conditions the gun is in operation but a few moments at one time and when the operation is discontinued by release of the valve-button, the vacuum at the nozzle is broken.

Inasmuch as the container is air tight, and a part of its liquid content has been withdrawn, the entrapped air in the container has expanded. It follows that, owing to the decrease of air-pressure in the container, air is drawn in at the end of the nozzle, which forces the oil in the annular space between the nozzle pipe 15 and the air pipe 16, rearwardly and back into the cup. The nozzle pipe is thus cleared of oil at the end of each operation so that the gun may be laid or hung in any position without the possibility of leakage at the nozzle tip.

At the same time, the air entering the container, brings the air entrapped therein back to atmospheric pressure, thus restoring the instrument to its normal condition for subsequent operation, and thereby prevents a partial vacuum in the cup 14.

The above results are attained automatically after each operation of the gun and without the use of air-vents or valves which were previously considered essential and which were a constant source of leakage and incapacitation.

By the use of the present invention, as hereinbefore described, leakage of oil at any time either during the operation or when the instrument is not in use, is positively prevented.

What I claim and desire to secure by Letters Patent is:

1. A spray gun comprising a lubricant container, an oil discharge conduit having a nozzle for the discharge of liquid at its outer end and provided with an inlet in that portion of the container lowermost when the gun is in its operative position, an air pipe having a jet cooperating with the nozzle, and valve-controlled means to connect the air-pipe with a source of pressure-fluid, the container having remote from the inlet of the conduit, a filler neck projecting into the container to define a space for the entrapment of air when the container is being filled, and a movable member providing an air-tight closure for the filler-neck.

2. A spray gun comprising a lubricant container, an oil discharge conduit having a nozzle for the discharge of liquid at its outer end and provided with an inlet in that portion of the container lowermost when the gun is in its operative position, and adjacent an end of the container, an air pipe having a jet cooperating with the nozzle, and valve-controlled means to connect the air-pipe with a source of pressure-fluid, the container having in its end opposite to that adjacent the inlet of the oil-pipe, a filler-neck that projects inwardly into the container, to define a space for the entrapment of air when the container, in a position in which its end having the filler neck is uppermost, is being filled, and a movable member providing an air-tight closure for the filler-neck.

In testimony whereof I have affixed my signature.

CARL A. NORGREN.